United States Patent [19]
Harms et al.

[11] Patent Number: 5,660,240
[45] Date of Patent: Aug. 26, 1997

[54] WATER AND DUST COLLECTOR FOR WET CORE DRILLING

[76] Inventors: Gregory W. Harms, P.O. Box 770, Milford, Ohio 45150; Keith W. Harms, 2960 Perthwood, Cincinnati, Ohio 45244

[21] Appl. No.: 473,529

[22] Filed: Jun. 7, 1995

[51] Int. Cl.$^6$ ................................. E21B 21/00
[52] U.S. Cl. ................................. 175/209
[58] Field of Search ................ 175/88, 207, 209, 175/212, 213

[56] References Cited

U.S. PATENT DOCUMENTS

| | | | |
|---|---|---|---|
| 2,041,690 | 5/1936 | Baumeister et al. | 175/209 X |
| 2,646,256 | 7/1953 | Lobbert | 255/50 |
| 2,829,867 | 4/1958 | Brochetti | 255/50 |
| 2,870,993 | 1/1959 | Jahnke | 255/47 |
| 2,879,035 | 3/1959 | Tilden | 175/213 X |
| 2,946,246 | 7/1960 | Allan | 77/62 |
| 3,033,298 | 5/1962 | Johnson | 175/209 |
| 3,045,769 | 7/1962 | Feucht et al. | 175/211 |
| 3,351,143 | 11/1967 | Seibold et al. | 175/209 |
| 3,498,674 | 3/1970 | Matthews | 299/4 |
| 3,848,686 | 11/1974 | Jysky et al. | 175/209 |
| 3,924,696 | 12/1975 | Horlin et al. | 175/209 |
| 4,205,728 | 6/1980 | Gloor et al. | 175/209 |
| 4,471,844 | 9/1984 | Gallagher | 175/209 |
| 4,921,375 | 5/1990 | Famulari | 175/209 X |

OTHER PUBLICATIONS

Catalog 393, "Milwaukee Heavy-Duty Electric Tools for Contractors and Industry", Milwaukee Electric Tool Corporation, 13135 West Lisbon Road, Brookfield, Wisconsin 53005, p. 39.

*Primary Examiner*—William P. Neuder
*Attorney, Agent, or Firm*—Frost & Jacobs

[57] ABSTRACT

A water and dust collector for the bit of a wet core drilling operation. The device comprises a dome-shaped element with a hole in its top to receive the core bit with relatively close clearance, and an annular planar bottom edge adapted to rest upon the surface being drilled, about the drilling site. The device has an outlet tube assembly near its bottom edge for connection to a wet-dry vacuum system, and at least one air inlet formed in the annular bottom surface substantially opposite the outlet tube assembly.

16 Claims, 1 Drawing Sheet

WATER AND DUST COLLECTOR FOR WET CORE DRILLING

TECHNICAL FIELD

The invention relates to a device capable of collecting dust, water and a mixture thereof about a drill bit, and more particularly to such a device which is dome-shaped, resting upon the surface being drilled, surrounding the drill bit adjacent the drilling site, and being connected to a wet-dry vacuum source.

BACKGROUND ART

The collector of the present invention is applicable to any drilling operation wherein a considerable amount of dust is generated during drilling. The collector of the present invention is also capable of collecting water, dust and a mixture thereof in a drilling operation where water is used as a cooling and lubricating agent for the drill bit. An excellent example of drilling which creates considerable dust and uses water is the core drilling of concrete. While not intended to be so limited, the present invention will be described in its application to the core drilling of concrete for purposes of an exemplary disclosure.

One of the problems associated with wet core drilling of concrete lies in the fact that some of the dust is trapped by the water. This concrete dust/water mixture tends to discolor or stain the concrete surface being drilled if not removed and cleaned therefrom.

Prior art workers have devised a water collecting ring constituting a relatively large oval upstanding continuous ring or wall. The device is completely open at the top and bottom and is adapted to sit upon the surface being drilled and to extend about the drilling site. A heavy duty balanced impeller pump may be located within the confines of the ring to collect water, or the collecting ring may be provided with a built-in fitting for the vacuum hose of a wet or dry vacuum source such as a shop vacuum cleaner or the like.

The water collecting ring has a number of drawbacks. First of all, it is relatively large and, if used, sometimes limits the selection of a drilling site. While the oval wall may be provided with a foam seal or the like along its bottom edge, slight wear tends to diminish the usefulness of the seal. Finally, since the device is simply a wall and therefore does not have any sort of top or cover, it cannot prevent splattering.

The present invention is based on the discovery that a far better job of collecting water and dust can be accomplished by a very much simpler and less expensive device. The collector of the present invention is dome-shaped. The drill bit passes through the top of the dome and the bottom of the dome terminates in a flat, annular, planar edge adapted to rest upon the surface of the material being drilled. The collector essentially encloses that portion of the drill bit adjacent the drilling site. The collector is provided with an outlet connectable to the hose of a wet-dry vacuum system. At the bottom edge of the device, opposite the outlet, one or more air inlets are provided to enable the vacuum source to operate properly. The device is held against the surface being drilled by the vacuum and does not require any soft sealing means associated with its planar annular bottom edge. As will be apparent hereinafter, the collector can be rather small having an internal diameter of a dimension less than twice the diameter of the core drill bit.

DISCLOSURE OF THE INVENTION

According to the invention there is provided a water and dust collector for the bit of a wet core drilling operation. The device is in the form of a dome-shaped element with an opening formed in its top and an annular planar bottom edge. The opening is sized to receive the core bit with a relatively close clearance. The collector surrounds the bit adjacent the drilling site.

The collector has an outlet tube assembly near its bottom edge. The outlet tube assembly is connectable to a wet-dry vacuum system such as a wet-dry shop vacuum sweeper. At least one air inlet is formed near its annular bottom surface, substantially opposite the outlet tube assembly, enabling the vacuum source to function properly.

The collector covers a relatively small area about the drill site so that the part of the material being drilled which must be cleaned constitutes a narrow annular area about the hole formed in the material.

BRIEF DESCRIPTION OF THE DRAWING

The drawing is a fragmentary cross-sectional view illustrating the core drill bit, the collector and its outlet assembly.

DETAILED DESCRIPTION OF A PREFERRED EMBODIMENT OF THE INVENTION

Figure 1:
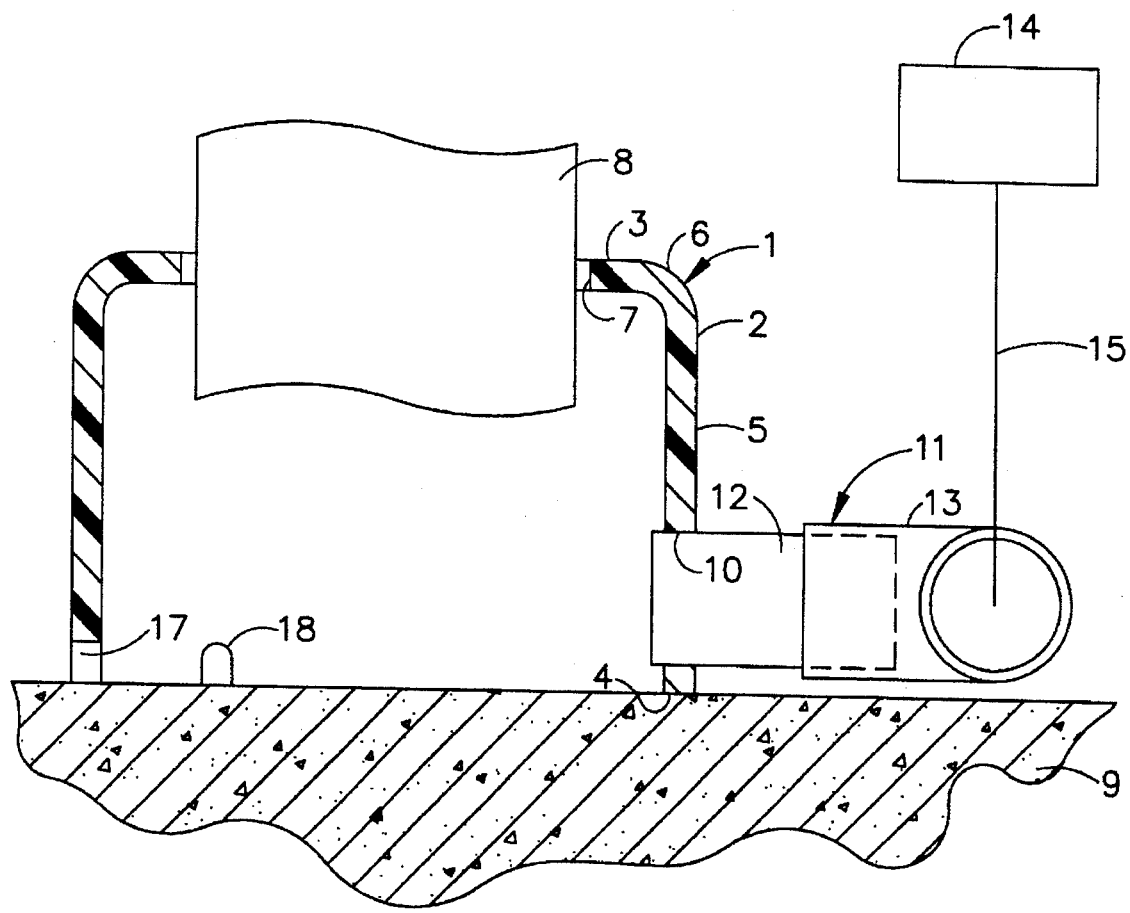

Referring to the drawing, the water and dust collector of the present invention is generally indicated at 1. The collector 1 comprises a dome-shaped, hollow body 2 which has a planar, annular top surface 3 and a planar annular bottom surface 4. While the peripheral shape of the body 2 does not constitute a limitation on the present invention, in the embodiment illustrated, the body 2 has a cylindrical portion 5 extending upwardly from the bottom surface 4. The cylindrical portion 5 is surmounted by an inwardly curved annular portion 6 which leads to the annular top surface 3.

Top surface is annular by virtue of the fact that it has a circular perforation 7 formed therein. The body of a conventional core drill bit, of the type used to drill concrete, is fragmentarily shown at 8. It will be noted that the bit 8 passes through the perforation 7 with modest clearance.

Collector 1 is shown with its bottom surface 4 resting upon a concrete member 9 to be drilled. Near bottom surface 4, the cylindrical sidewall 5 has a perforation 10 formed therein. An outlet tube assembly, generally indicated at 11, is affixed within perforation 10 in fluid tight fashion. The outlet tube assembly 11 may take any appropriate form. It could, for example, be a simple rectilinear tube 12. In the embodiment illustrated in the Figure, the tube 12 is provided with a 90 degree elbow 13.

Whatever the nature of the outlet tube assembly 11, its free end must have an outside diameter such that it can be received within a flexible hose leading to a vacuum system, with a reasonably good sealing fit. Alternatively, the free end of the outlet tube assembly must have an inside diameter such that it can receive a flexible hose leading to a vacuum system with a reasonably good sealing fit. In the Figure, a vacuum system is diagrammatically illustrated at 14 and a flexible hose extending between the outlet tube assembly 11 and the vacuum system 14 is diagrammatically indicated at 15. As used herein, the phrase "a reasonably good sealing fit" means a fit such that the vacuum source 14 can draw an adequate vacuum within the collector 1 without significant leakage at the juncture of the outlet tube assembly 11 and the flexible hose 15.

The collector 1 is completed by providing one or more vent holes extending upwardly from the bottom surface 4. Excellent results have been achieved when a first vent hole 16 was provided diametrically across from perforation 10, and two additional vent holes were evenly spaced to either side of vent hole 16. A second one of the vent holes is shown at 17, the third vent hole is not visible in the cross-sectional view of the Figure.

The size of the collector 1 can vary to suit the application and the size of the core drill bit being used. An exemplary embodiment of the collector 1 was made. The exemplary collector was intended to be used with a core drill bit having an outer diameter of 2½ inches. To this end, cylindrical wall 5 of the exemplary collector had an outside diameter of 4 inches and an inside diameter of 3⅝ inches. Perforation 7 in the top 3 of exemplary collector had an inside diameter of 2⅝ inches. The exemplary collector had an overall height of 2½ inches.

The arched vent holes (two of the three of which are shown at 17 and 18 in the Figure) were located in an arcuate array opposite perforation 10 and had a width and height of about ¼ inch.

The tube 12 had a ⅞ inch outer diameter and a length of 1½ inches. The 90 degree elbow 13 had a ⅞ inch internal diameter capable of accepting the tube 12 at one end and the end of flexible hose 15 at the other.

The collector 1, the tube 12 and the elbow 13 were all made of plumbing grade PVC (polyvinyl chloride). The tube 12 was affixed within perforation 10, and the elbow 13 was affixed to the free end of tube 12 by any appropriate means such as gluing, solvent welding or the like.

The device having been described in detail, its mode of use may now be set forth. The core bit is inserted through the perforation 7 of collector 1 at the location to be drilled. The outlet tube assembly 11 is connected to the vacuum system hose 15 and the vacuum system is turned on. It will be understood that any appropriate vacuum system can be used, including a shop vacuum sweeper. When water is not involved in the drilling, a dry vacuum sweeper may be used. When water is involved in the drilling, as in core drilling of concrete, a wet-dry vacuum is required.

Once the vacuum is turned on, the water flow is started and drilling is begun. When drilling is completed, the drill is turned off. Thereafter the water is turned off and the bit is removed from collector 1. Finally, the vacuum system 14 is turned off.

It will be apparent from the above description that the collector of the present invention is characterized by lightweight, durability and inexpensive construction. The collector is efficient, reducing clean-up of the area drilled to a minimum. The collector is smaller than conventional collection rings, allowing greater flexibility with respect to drilling location. The collector is more effective than prior art devices, containing both splatter and run-off of the waste water. Finally, the collector is easy to use and easy to store.

Modifications may be made in the invention without departing from the spirit of it.

What is claimed:

1. A collector for use with a drill bit for collecting waste products created during a drilling operation upon a workpiece, said collector comprising a body with a top and a planar, annular bottom edge adapted to rest upon said workpiece, said collector top having a first perforation therein to receive said bit with close clearance, an outlet tube fixed in a second perforation in said collector body, and at least one vent opening formed in said collector body, wherein said vent opening is provided at said bottom edge of said body.

2. The collector claimed in claim 1, wherein said body is generally dome-shaped.

3. The collector claimed in claim 1, wherein said second perforation is located near said bottom edge of said body.

4. The collector claimed in claim 1, wherein said workpiece is a concrete member, said bit is a wet core drill bit and said waste products comprise dust, water and a mixture thereof.

5. The collector claimed in claim 1, wherein at least one of said collector and said outlet tube is made of PVC.

6. The collector claimed in claim 1, wherein said collector body has an inside diameter less than about twice the diameter of said bit.

7. The collector claimed in claim 1, further comprising a vacuum system releasably connectable to said outlet tube.

8. The collector claimed in claim 1, wherein said at least one vent opening is disposed substantially opposite said outlet tube.

9. A collector for use with a wet core type drill bit for collecting dust, water and a mixture thereof created during drilling of a concrete member having a planar surface at and about the drilling site, said collector comprising a body having a top and a planar annular bottom edge adapted to rest upon said planar surface of said concrete member about said drilling site, said collector top having a first perforation therein to receive said bit with close clearance, an outlet tube fixed in a second perforation in said body, and at least one vent opening in said body, wherein said vent opening is provided at said bottom edge of said body.

10. The collector claimed in claim 9, wherein said body is generally dome-shaped.

11. The collector claimed in claim 9, wherein said second perforation is located near said bottom edge of said body.

12. The collector claimed in claim 9, wherein said workpiece is a concrete member, said bit is a wet core drill bit and said waste products comprise dust, water and a mixture thereof.

13. The collector claimed in claim 9, wherein at least one of said collector and said outlet tube is made of PVC.

14. The collector claimed in claim 9, wherein said collector body has an inside diameter less than about twice the diameter of said bit.

15. The collector claimed in claim 9, further comprising a vacuum system releasably connectable to said outlet tube.

16. The collector claimed in claim 9, wherein said at least one vent opening is disposed substantially opposite said outlet tube.

* * * * *